(12) United States Patent
Hoffman, Jr. et al.

(10) Patent No.: US 6,377,253 B1
(45) Date of Patent: *Apr. 23, 2002

(54) SYSTEM TOUR GENERATOR

(75) Inventors: Robert R. Hoffman, Jr., Mounds View; Robert A. Williams, Minneapolis, both of MN (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,330

(22) Filed: Nov. 30, 1998

(51) Int. Cl.[7] .............................................. G06F 13/00
(52) U.S. Cl. ........................ 345/336; 345/338; 345/357; 717/11
(58) Field of Search ................................ 345/328, 336, 345/338, 357, 966, 965, 967; 707/501; 717/11; 713/100

(56) References Cited

U.S. PATENT DOCUMENTS

| | | | |
|---|---|---|---|
| 4,696,003 A | | 9/1987 | Kerrs et al. .................... 714/38 |
| 5,555,416 A | * | 9/1996 | Owens et al. ................. 717/11 |
| 5,586,324 A | * | 12/1996 | Sato et al. ...................... 713/2 |
| 5,668,992 A | * | 9/1997 | Hammer et al. ................ 713/1 |
| 5,708,825 A | * | 1/1998 | Sotomayor .................... 707/501 |
| 5,742,829 A | * | 4/1998 | Davis et al. ................... 717/11 |
| 5,774,118 A | | 6/1998 | Hatakama .................... 345/707 |
| 5,799,268 A | | 8/1998 | Boguraev ....................... 704/9 |
| 5,963,743 A | * | 10/1999 | Amberg et al. ............... 717/11 |
| 5,974,454 A | * | 10/1999 | Apfel et al. ................. 709/221 |
| 5,982,445 A | | 11/1999 | Eyer et al. ................... 348/461 |
| 6,038,545 A | * | 3/2000 | Mandeberg et al. .......... 705/15 |
| 6,058,167 A | | 5/2000 | Iglehart et al. .......... 379/93.17 |

OTHER PUBLICATIONS

Robert R. Hoffman Jr. and Robert A. Williams, U.S. Pat. application Ser. No. 09/203,109, filed Nov. 30, 1998, entitled "System Tour Generator".

* cited by examiner

Primary Examiner—Raymond J. Bayerl
Assistant Examiner—Tadesse Hailu
(74) Attorney, Agent, or Firm—Trop, Pruner & Hu, P.C.

(57) ABSTRACT

A technique to generate a web-based presentation is described that includes obtaining an entry from a feature table (the entry having an identification portion and an installation portion), and generating at least part of the presentation based on the installation portion if the entry corresponds to a loaded feature. At least a part of the presentation may also be generated based on entries not associated with operational features of a computer system. The method may be automatically executed on initial system power-up, or on user command.

8 Claims, 4 Drawing Sheets

100

Welcome to the Micron System Tour!
   102

Choose a Topic Below
to Learn More about
the Features of Your
NEW Micron PC!

| Setup Management |
| 106 |

| Telephony |
| 108 |

| Contact Micron |
| 110 |

SYSTEM TOUR GENERATOR

BACKGROUND

The invention relates generally to human-computer interfaces, and more particularly to a self-generating on-line computer based help and tutorial system.

It is becoming common for purchasers (consumer and industrial) of computer systems to custom order their machine directly from the manufacturer (e.g., an original equipment manufacturer, OEM). In addition to specifying the central processing unit, amount of system random access memory, and one or more types of long-term storage (e.g., magnetic and optical disk units), purchasers may also request their system come configured to provide certain features. Illustrative features include telephony, a backup subsystem, and digital video disk capability.

Systems are typically shipped to the purchaser with the requested features' associated software preloaded and ready to run. To assist the user, many software applications provide on-line help systems and user manuals. While on-line help systems and manuals may assist users in determining how to use a specific application or feature, they are often underused because they are perceived as difficult to understand, especially to new users. In addition, on-line help systems and manuals do not provide the user with an overall introduction to their computer system, taking instead on a feature-by-feature approach.

Failure to provide users with an overall or system's level introduction may lead to misuse, nonuse, calls to a vendor's technical support department, or feelings of dissatisfaction of the very features the user requested. This may be a particularly important issue for users of a new computer system. Thus, there is a continuing and significant need to provide users with an automated and easy to use system's level introduction to their new computer system.

SUMMARY

In one embodiment the invention provides a method to generate a web-based presentation. The method includes obtaining an entry from a feature table (the entry having an identification portion and an installation portion), and generating at least part of the presentation based on the installation portion if the entry corresponds to a loaded feature. The method may also provide for generating part of the presentation based on one or more entries that are not associated with operational features of a computer system. In some instances, the method may be automatically executed.

DETAILED DESCRIPTION

Techniques (including methods and devices) to provide automated and easy to use tutorial and on-line help information to computer system users are described. The following embodiments of this inventive concept are illustrative only and are not to be considered limiting in any respect.

The growing popularity of web-based presentations (presentations that utilize hypertext links and/or the internet), and the ability to automatically and dynamically incorporate hypertext links in a web-browser or browser-like environment, makes it possible to provide tutorial and on-line help information in a manner that may be more readily understood, useful, interesting, and beneficial to a user than prior techniques.

Figure 1:
FIG. 1 shows an illustrative main page created by a System Tour Generator (STG) in accordance with one embodiment of the invention.
Figure 1:
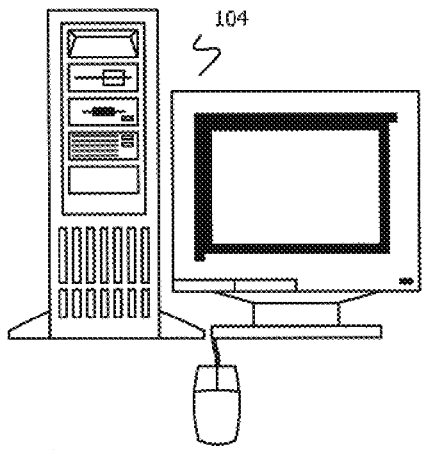

In accordance with one embodiment of the invention, a System Tour Generator (STG) may create and display a web-based presentation or system tour for a new user in accordance with FIG. 1. The system tour may include a document (a main page 100) containing text 102, graphics 104, and hypertext links (hereinafter links) to sub-tours (that is, information about one or more of the features available to the user on their particular system such as a system setup management sub-tour link 106 and a telephony feature sub-tour link 108). One or more links may to sales and technical contact information 110 may also be provided. In another embodiment of the invention, a STG may create and display a web-based presentation of more advanced information. For example, sub-tours dealing with advanced attributes and technical data may be provided.

Sub-tours may be created for each feature of the computer system. In general, a feature may be any device, software or combination thereof which adds value to a computer system, the use of which may be enhanced by providing instructions to the end user. Illustrative features include telephony (e.g., a modem with telephone, messaging and speaker phone capability), a magnetic tape backup subsystem, digital video disk (DVD) and removable mass storage device capabilities. Each sub-tour may contain information specific to the associated feature such as getting started instructions, set-up tips and tricks, frequently asked questions (FAQs), links to manufacturer web sites and links to third party sites providing support (e.g., third party technical support, discussion groups relating to the feature and sites providing products and services associated with the feature).

Figure 2:
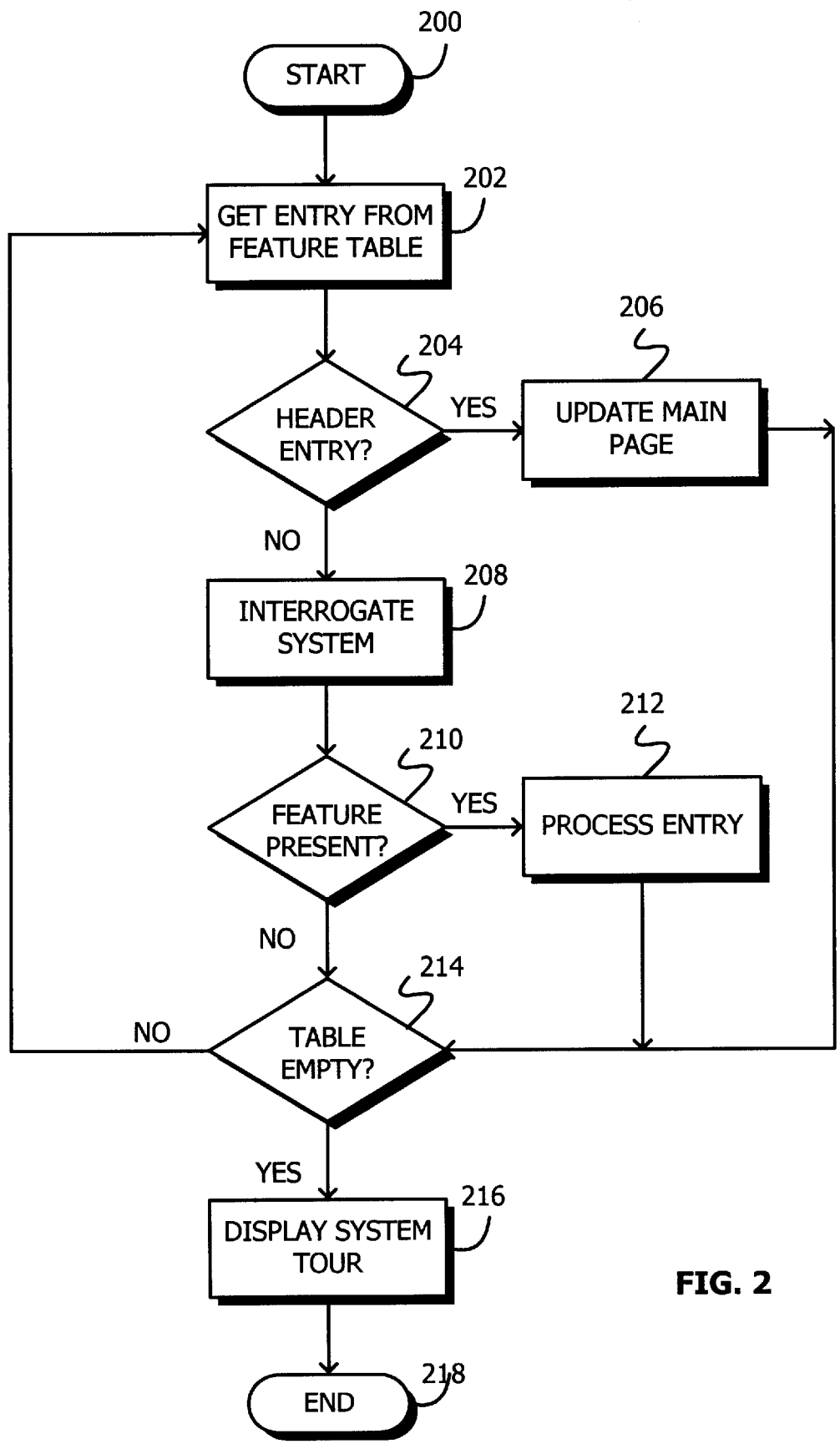
FIG. 2 shows a method to create a system tour in accordance with one embodiment of the invention.

Referring to FIG. 2, a method in accordance with one embodiment of the invention to create a system tour is shown. On system power-up (block 200) an STG may obtain the first entry of a feature table (block 202). In one embodiment, the feature table provides the STG application with the logic needed to create a main page.

Figure 3:
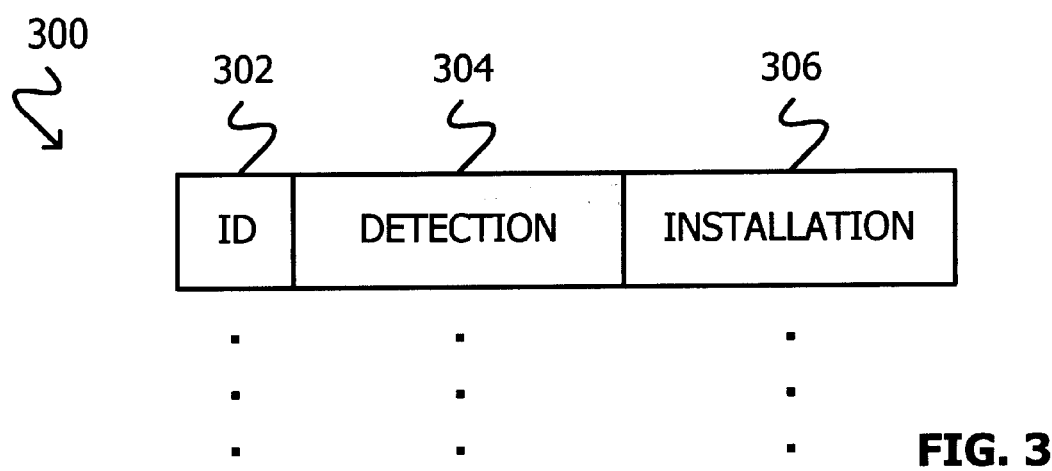
FIG. 3 shows a feature table entry in accordance with one embodiment of the invention.

Referring now to FIG. 3, each feature table entry 300 may include an identification field 302, a detection field 304 and an installation field 306. Identification field 302 may identify the entry as a feature entry or a header entry. Feature entries are associated with features (e.g., telephony) and may be used by the STG to create sub-tours (see discussion below). Header entries may be used by the STG to place information on the system tour's main page without regard to an associated feature. Header type information may include manufacturer identification (e.g., a graphical link to the manufacturer's main and/or technical assist web site) and advertisements. Detection field 304 informs the STG how to determine if the identified feature has been installed. (Header entries may have a null detection field.) For example, many features may be associated with one or more registry keys (in a windows based operating system), one or more application programs or one or more dynamic link libraries (DLLS) —detection field 304 may identify one or more of these entities. Installation field 306 indicates how the STG is to place the (header or feature/sub-tour) information on the system tour's main page. For example, installation field 306 may include hypertext markup language (HTML) instructions that are inserted into the system tour's main page document. In another embodiment, installation field 306 may indicate a file that is to be inserted into the system tour's main page document. In yet another embodiment, installation field 306 may include a script program that the STG executes (or has executed by another program) to include the relevant information in the system tour's main page. In another embodiment, the feature table does not have to have a detection field. Instead, the STG could take a default action wherein the it looks for windows registry entries associated with the feature indicated in the identification field.

Returning again to FIG. 2, if the entry is a header type entry (the 'yes' prong of diamond 204), the entry's installation field may be used to update the system tour's main page (block 206) and processing continues at block 214. If the entry is a feature type entry (the 'no' prong of diamond 204), the entry's detection field is used to determine if the feature has been installed (block 208). If the feature has been installed (the 'yes' prong of diamond 210), the entry's installation field is used to update the system tour's main page to reflect the feature's sub-tour (block 212). Following block 212, or in the event the feature associated with the current entry is not installed (the 'no' prong of diamond 210), the STG determines if all entries in the feature table have been processed. If all feature table entries have been processed (the 'yes' prong of diamond 214), the resulting system tour is displayed (block 216), and STG processing terminates (block 218). If all feature table entries have not been processed (the 'no' prong of diamond 214), processing continues with the next feature table entry (block 202).

In one embodiment, a feature table entry may be processed (block 212) by inserting on the system tour's main page textual and graphical information relating to the feature. In addition, links to collateral information stored either on a storage unit coupled to the computer system (e.g., a magnetic or optical CD ROM disk) or at a distant site (e.g., a manufacturer's web site) may be inserted into the system tour's main page. In general, links may be textual or graphical in nature and may invoke presentation of additional information—text, and/or graphs, and/or audio and/or video in nature. For example, processing a feature entry (in accordance with the entry's installation field) may result in a link (e.g., a replica of the feature's graphical trademark) to the feature's manufacturer being placed on the main page. Introductory information of the type discussed above may be provided may also be provided on the main page.

In another embodiment, the feature table and all related sub-tour data is stored in a specified location on a computer system's long-term storage unit. During execution, the STG may create a system tour directory and place the main page (and associated files such as graphics and audio files) in the system tour directory. Following creation of the system tour's main page, the STG may delete the original feature table and all sub-tour modules associated with features not installed. In this manner, the user has access to the system tour whenever she/he wants, but the memory associated with non-installed features has been reclaimed for use.

In one embodiment the system tour may be generated the first time the end user (e.g., purchaser) powers-up their computer system. In a windows environment, this feature may be provided by associating the window's registry key "RunOnce" to the STG. In another embodiment, the system tour may be generated on user command.

Figure 4:
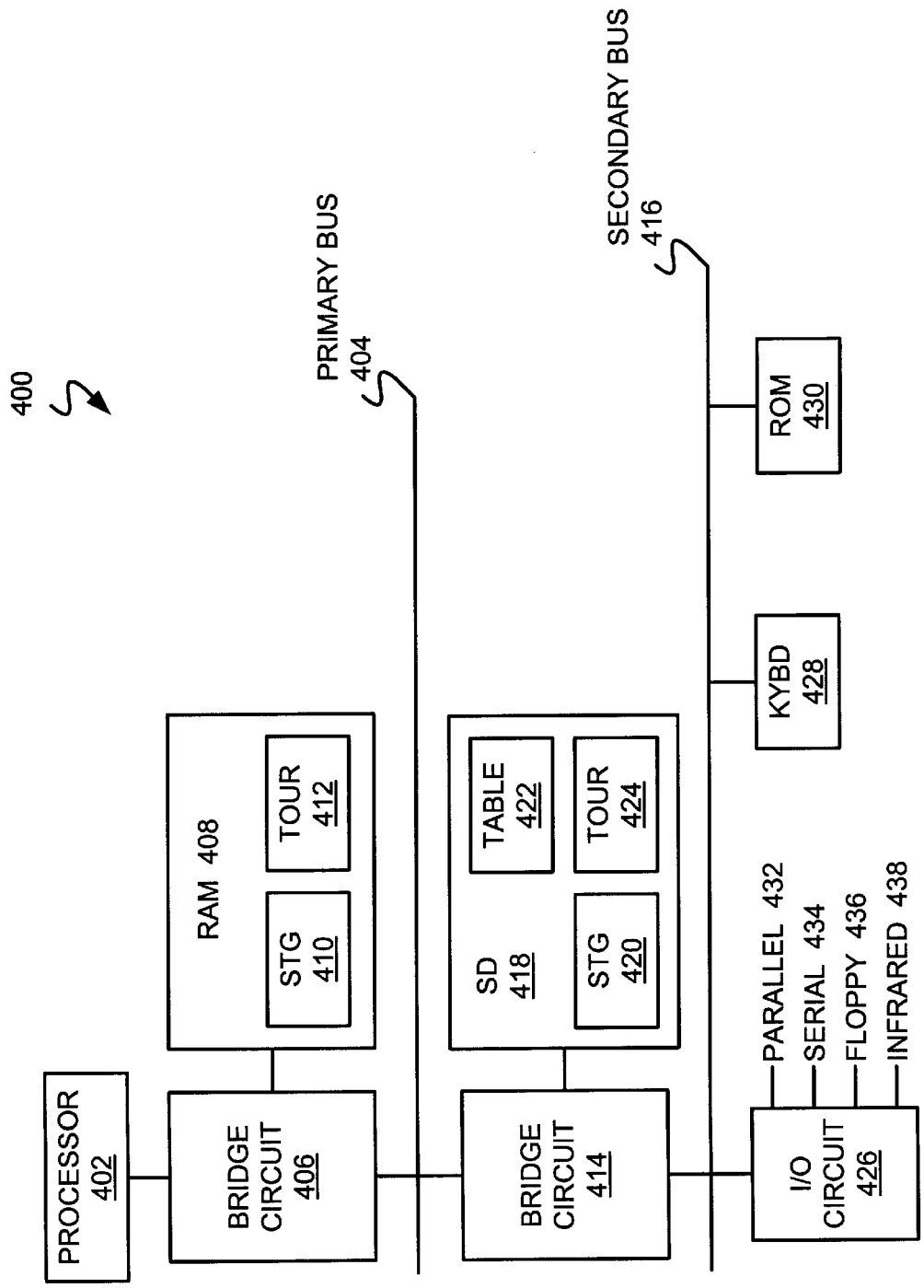
FIG. 4 shows a computer system in accordance with one embodiment of the invention.

Referring to FIG. 4, a computer system 400 for providing system tour capability in accordance with one embodiment of the invention is shown. Computer system 400 includes processor 402 coupled to primary bus 404 through bridge circuit 406. Processor 402 may be a general purpose processor such as a microprocessor, or a special purpose processor such as a digital signal processor or microcontroller. Bridge circuit 406 typically provides an interface to system random access memory (RAM) 408. During execution, a copy of STG program 410 may reside in RAM 408. In addition, STG 410 typically creates the system tour's main page 412 in RAM 408.

Bridge circuit 414 may couple primary bus 404 to secondary bus 416, while also providing interfaces to integrated device electronics (IDE) devices such as storage device 418. At system assembly time, a copy of STG program 420, feature table 422, and tour data 424 (e.g., information associated with feature table entries) may be loaded on storage device 418. During STG execution, processor 402 may copy STG program 420 into RAM 408 to create STG execution copy 410. Illustrative storage devices (e.g., 418) include long-term storage devices such as magnetic hard disks (fixed, floppy, and removable), magnetic tape, optical disk units, and all forms of electronic non-volatile memory (e.g., programmable read only memories).

Secondary bus 416 may also couple input-output (I/O) circuit 426, keyboard controller (KYBD) 428, and system read only memory (ROM) 430 may also be coupled to system 400. Input-output circuit 426 may provide an interface for parallel 432 and serial 434 ports, floppy disks 436, and infrared devices 438.

One benefit to providing a user with system information in a web-based environment as described above, is that a manufacturer may gradually develop a series of sub-tour modules. As each sub-tour is created (either by the system manufacturer or the feature manufacturer), an entry for that sub-tour may be placed in the feature table. Because only those entries associated with features actually installed are processed by the STG (see block 212 of FIG. 2), the same feature table may be stored on a large number of computer system storage devices during the manufacturing process. Another benefit to the presentation of information as described above, is that it may provide a new user with all the information, including links to additional support centers, in a easy to understand and use manner.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method usable with a computer system, comprising:

sequencing through entries of a feature table, at least some of the different entries being associated with different features that may be present in the computer system;

for each entry encountered in the sequencing, determining if the entry is associated with one of the features; and using information indicated by the entries that are associated with the features of the computer system to generate a viewable presentation on the computer system describing the associated features.

2. The method of claim 1, wherein the using comprises:

executing hypertext markup language instructions that are located in the entries.

3. The method of claim 1, wherein the using comprises:
inserting files from the entries into a main presentation tour document.

4. The method of claim 1, wherein some of the entries indicate information that does not correspond to one of the features.

5. The method of claim 1, further comprising:
retrieving the entries from a long-term storage device.

6. The method of claim 5, further comprising deleting the feature table from the long-term storage device after the generation of the presentation.

7. The method of claim 1, wherein the determining comprises:

using a detection portion of each entry, the detection portion indicating how to determine if the entry corresponds to a feature or a non-feature.

8. The method of claim 1, wherein the method is performed the first time an end user powers on a computer system.

* * * * *